United States Patent
Mau et al.

(10) Patent No.: US 8,083,402 B2
(45) Date of Patent: Dec. 27, 2011

(54) SENSOR ARRANGEMENT FOR TEMPERATURE MEASUREMENT

(75) Inventors: Gert Mau, Aildingen (DE); Christoph Raab, Stuttgart (DE)

(73) Assignee: SITRONIC Ges. fuer elektrotechnische Ausruestung mbH & Co. KG, Gaertringen (DE)

( * ) Notice: Subject to any disclaimer, the term of this patent is extended or adjusted under 35 U.S.C. 154(b) by 870 days.

(21) Appl. No.: 11/918,436

(22) PCT Filed: Feb. 7, 2006

(86) PCT No.: PCT/DE2006/000197
§ 371 (c)(1),
(2), (4) Date: May 14, 2008

(87) PCT Pub. No.: WO2006/108367
PCT Pub. Date: Oct. 19, 2006

(65) Prior Publication Data
US 2008/0317093 A1    Dec. 25, 2008

(30) Foreign Application Priority Data

Apr. 12, 2005 (DE) .................. 10 2005 016 896

(51) Int. Cl.
*G01K 1/14* (2006.01)
*G01K 1/12* (2006.01)
(52) U.S. Cl. .................. 374/141; 374/208; 374/109
(58) Field of Classification Search .................. 374/100, 374/163, 170, 179, 178, 183, 185, 208, 141, 374/109, 16, 28; 73/866.5, 73
See application file for complete search history.

(56) References Cited

U.S. PATENT DOCUMENTS

| | | | | |
|---|---|---|---|---|
| 3,832,669 | A * | 8/1974 | Mueller et al. | 338/28 |
| 4,054,057 | A * | 10/1977 | Kluge | 374/158 |
| 4,424,507 | A * | 1/1984 | Nagai et al. | 338/22 R |
| 5,089,687 | A * | 2/1992 | Bartrug et al. | 219/203 |
| 5,165,798 | A * | 11/1992 | Watanabe | 374/208 |
| 5,366,291 | A * | 11/1994 | Nakagama et al. | 374/153 |
| 5,716,133 | A * | 2/1998 | Hosokawa et al. | 374/121 |
| 5,781,098 | A * | 7/1998 | Shibata | 338/28 |
| 5,936,511 | A * | 8/1999 | Kawamoto et al. | 338/22 R |
| 6,068,399 | A * | 5/2000 | Tseng | 374/163 |
| 6,193,414 | B1 * | 2/2001 | Balzano | 374/208 |
| 6,257,758 | B1 | 7/2001 | Culbertson | |
| 6,311,016 | B1 * | 10/2001 | Yanagawa et al. | 392/416 |
| 6,407,365 | B1 * | 6/2002 | De Prete, III | 219/203 |
| 6,588,931 | B2 * | 7/2003 | Betzner et al. | 374/185 |
| 6,728,498 | B2 * | 4/2004 | Takeuchi | 399/69 |
| 6,984,064 | B1 * | 1/2006 | Touzelbaev | 374/43 |
| 7,197,927 | B2 * | 4/2007 | Stauss et al. | 73/335.02 |

(Continued)

FOREIGN PATENT DOCUMENTS

DE   19728804   2/1999

(Continued)

*Primary Examiner* — Gail Verbitsky
(74) *Attorney, Agent, or Firm* — Walter A. Hackler

(57) ABSTRACT

In a sensor arrangement for measuring the temperature of a surface with a temperature sensor provided on a circuit substrate, which is attached on a front side of a tongue-shaped projection of said circuit substrates and can be positioned in the direct proximity to said surface spaced apart from said circuit substrate, wherein a flexible heat conductive element surrounding said tongue-shaped projection in the region of said temperature sensor with a heat conductive cap or heat conductive foil is attached for the contacting of said surface.

13 Claims, 2 Drawing Sheets

U.S. PATENT DOCUMENTS

| | | | |
|---|---|---|---|
| 7,201,513 B2 * | 4/2007 | Nakabayashi | 374/208 |
| 7,316,507 B2 * | 1/2008 | Sisk et al. | 374/208 |
| 7,946,505 B2 * | 5/2011 | Lynam et al. | 236/44 C |
| 2003/0223474 A1 | 12/2003 | Roepke | |
| 2005/0178200 A1 * | 8/2005 | Stauss et al. | 73/335.02 |
| 2008/0121034 A1 * | 5/2008 | Lynam et al. | 73/335.05 |

FOREIGN PATENT DOCUMENTS

| | | | |
|---|---|---|---|
| DE | 10227454 | | 5/2003 |
| DE | 102006060547 | * | 6/2008 |
| EP | 305027 A2 | * | 3/1989 |
| EP | 718165 A1 | * | 6/1996 |
| EP | 1 026 486 A2 | | 8/2000 |
| EP | 1306242 A1 | * | 5/2003 |
| FR | 2728514 A1 | * | 6/1996 |
| JP | 9-21082 | | 8/1997 |

\* cited by examiner

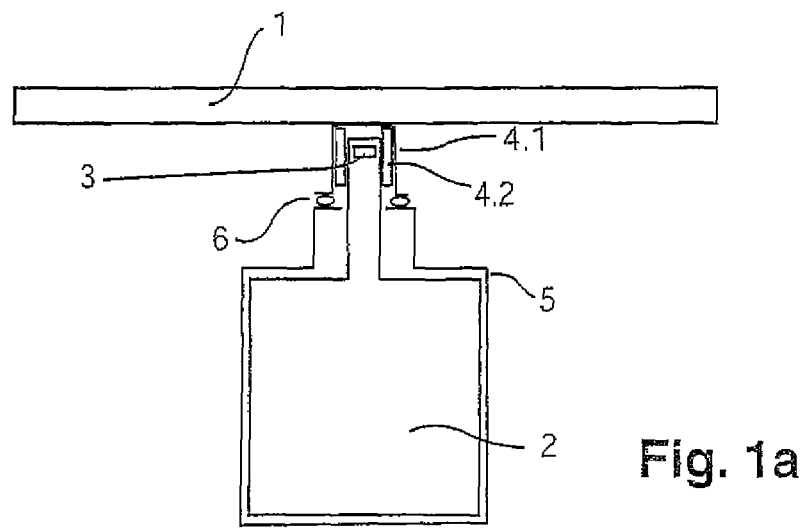
Fig. 1a
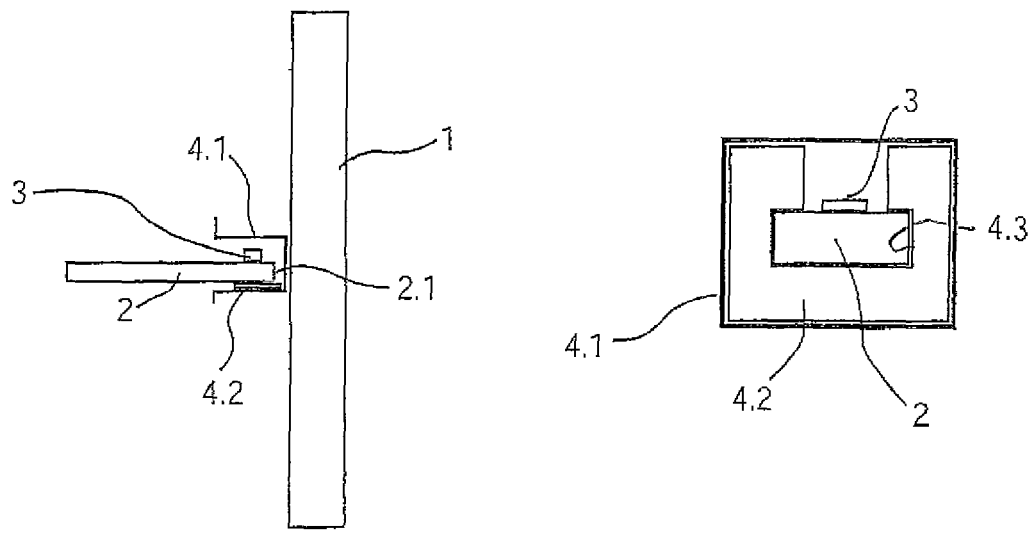
Fig. 1b
Fig. 1c

SENSOR ARRANGEMENT FOR TEMPERATURE MEASUREMENT

The invention relates to a sensor arrangement for measuring the temperature of a surface.

Such sensor arrangements, preferably for measuring the temperature of approximately planar surfaces, are variously known.

From DE 699 07 493 T2 a surface temperature sensor is known in which a heat conducting surface contact part is pressed against the surface to be measured by means of a spring. The surface contact part contains an attached electrically insulated temperature sensor.

From DE 102 27 454 A1 a clip on temperature sensor is known in which an attaching part is connected in a thermally conductive manner by means of a heat conductive foil and a heat conductive paste to the surface to be measured. A temperature sensor is coupled to the temperature sensor by means of a further heat conductive foil.

JP 09-210802 A describes a terminal for heat coupling comprising a T-shaped part which is large enough to receive a temperature sensor as well as a detection terminal out of a conductive material wherein an electrode of the temperature sensor is electrically connected via a wire connection with the detection terminal.

EP 1 026 489 A1 discloses a contact temperature measuring device with a probe head which contains a temperature sensor, wherein the probe head has flexible feed wires which leave the head and run through a screen which is thermally insulated from the probe head. The probe head is tiltable and is led only through the feed wires when tilted.

SUMMARY OF THE INVENTION

The object of the invention is to provide a cost-effective sensor arrangement with which the temperature of an approximately level surface, in particular, a pane can be detected.

This object is solved according to the invention by the sensor arrangement of claim 1. The dependent claims represent preferred embodiments of the invention.

The sensor arrangement according to the invention for measuring the temperature of a surface has a temperature sensor attached to a circuit substrate, which is attached to the front side of a tongue-shaped projection of the circuit substrate and can be positioned in the direct proximity of the surface spaced apart from the circuit substrate, wherein on the circuit substrate a flexible heat-conductive element surrounding the tongue-shaped projection in the region of the temperature sensor with a heat conductive cap or heat conductive foil for contacting the surface is attached.

The attachment of the temperature sensor directly on the circuit substrate reduces the costs of the sensor arrangement since no additional connecting elements are required. Through the good heat conductive conductor paths of the circuit substrate the heat from the surface can be transferred via the circuit substrate to the temperature sensor. For this purpose the circuit substrate is connected by means of a heat conductive element with the surface, wherein the front side of the circuit substrate is preferably directed approximately parallel to the surface. The heat conductive element is designed to be flexible so that it can accept mechanical stress, whereby a damage of the circuit substrate or the temperature sensor can be avoided during installation or removal or operation.

In a particularly preferred embodiment, a heat conductive insert is introduced in the cap. The cap allows that the sensor arrangement can be displaced along the surface smoothly and/or can be turned, which is particularly advantageous during installation and removal of the sensor arrangement, e.g. when the circuit substrate is secured by means of a bayonet lock. The insert consists of a flexible material.

In a preferred development, the cap is made out of a good heat conductive metal, in particular, copper or aluminium. The cap can transfer in this case the heat to the heat conductive insert particularly well. Furthermore, caps out of these materials are manufactured particularly cost-effectively.

In a further preferred development, the insert is made out of heat conductive silicone which is inserted or injected in the cap, whereby a good heat contact with the cap can be made.

In a particularly preferred development, there is a recess in the insert in which the circuit substrate can be placed with the temperature sensor. Thereby a particularly close heat contact of the temperature sensor with the insert is enabled.

In another advantageous development, the insert is arranged on the side opposed to the circuit substrate. In this case, a flat and thus particularly strong heat conductive connection of the circuit substrate can be made with the insert.

In a preferred development, a flexible seal is mounted between the cap and a housing of the circuit substrate. The flexible and/or resilient seal, for example, a silicone ring presses the cap against the surface, wherein mechanical tolerances through the resilience can be compensated and mechanical damages of the arrangement when pressing can be avoided.

In an alternative embodiment, a heat conductive foil, in particular, a silicone foil is the heat conductive element. Such a foil represents a cost-effective realization for the heat conductive element. The foil can be displaced along the surface without this causing any damages to the arrangement. This is particularly advantageous when installing and removing with a bayonet lock.

In a preferred development, the heat conductive foil is connected with a housing which surrounds the circuit substrate through adhering, soldering, clamping, screwing or injecting. Hereby a firm connection of the foil with the housing is enabled.

In a preferred development, the heat conductive foil is built up in two layers in at least one section. The layer showing towards the surface is preferably made of a thin material with good gliding properties, in particular, a metal foil. The side showing towards the circuit substrate here consists of a soft, flexible material, in particular, a heat conductive silicone. Thereby the surface of the metal foil can be considerably larger than the surface of the silicone layer. In particular, the silicone layer can be provided only in a section of the metal foil which borders on the front side of the circuit substrate.

In an especially preferred embodiment the circuit substrate is metallized on the front side on the side facing the temperature sensor and/or on the side surfaces. A good heat conductivity is ensured through metallization. The metallization in this connection can simultaneously serve as the electrical contact of the temperature sensor. In particular, the metallization of the front side can be connected with a terminal of the temperature sensor.

In a further development, feedthrough interconnections are provided in the proximity of the temperature sensor. These are generally executed as plated bores through the circuit substrate and form both the electrical as well as the thermal connection of the temperature sensor with the underside of the circuit substrate on which, in this case, a preferred flat metallization is applied.

In a preferred embodiment, an evaluation unit is provided additionally on the circuit substrate so that a common component for both measuring as well as for evaluating can be used.

In another preferred embodiment, further sensors are provided on the circuit substrate, in particular temperature sensors, humidity sensors or light sensors. The circuit substrate is installed in this case preferably in the passenger compartment of a motor vehicle and serves to measure the temperature of the front windshield. For this purpose it can be preferably be integrated in a rear-view mirror base as housing. Through simultaneous measuring of the temperature of the windshield surface, the interior of the passenger compartment as well as the humidity with the corresponding sensors, the sensor arrangement, for example, can be used for measuring the windscreen fogging.

Further advantages emerge from the description and the drawings. The above-named features and other features still to be indicated can be used, respectively, individually or in combination. The embodiments mentioned are not intended to be understood as a complete list but rather have exemplary character.

The invention is explained in detail on the basis of embodiments under reference to the drawings. The figures of the drawings show the subject matter of the invention very schematically and are not to be understood as being to scale. The individual components of the subject matter according to the invention are represented in such a way that their structure can be well displayed. In the figures:

BRIEF DESCRIPTION OF THE DRAWINGS

FIG. 1a-c shows a plan view, a side view and a cross-section through a first embodiment of the sensor arrangement according to the invention with a cap and a flexible heat conductive insert as the heat conductive element.

DETAILED DESCRIPTION

Figure 2A:
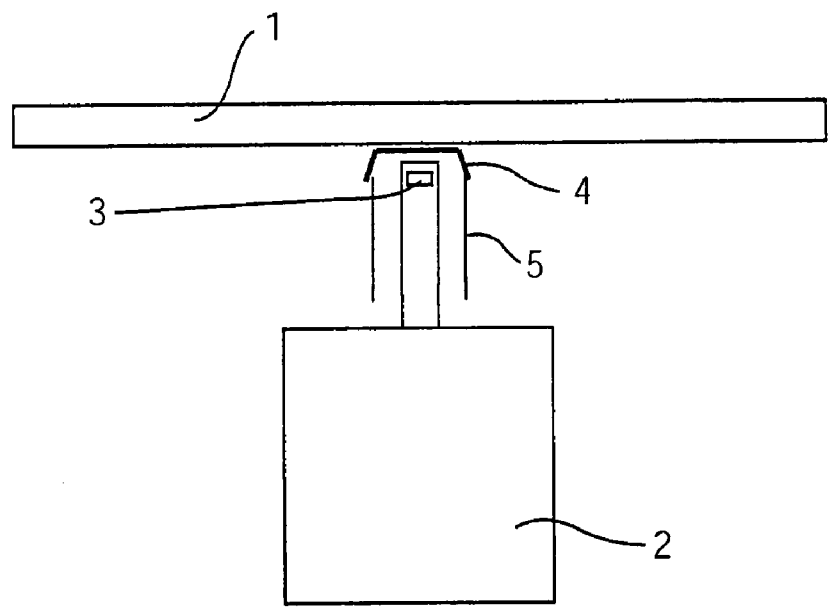
FIGS. 2a,b shows a plan view, respectively, a side view of a second embodiment form of the sensor arrangement according to the invention with a heat conductive foil as the flexible heat conductive element.

In FIG. 1 a sensor arrangement for temperature measurement is shown on an almost planar surface 1 formed by the front windscreen of a motor vehicle. The sensor arrangement comprises a temperature sensor 3, which is arranged on a circuit substrate 2 in the direct proximity to a front side 2.1 of circuit substrate 2. The front side 2.1 runs parallel to the surface 1 along a tongue-shaped projection of the circuit substrate 2 and is positioned in the direct proximity of surface 1. The circuit substrate 2 is surrounded by a housing 5 which is attached to a rear-view mirror base of a rear-view mirror of a motor vehicle which has an opening in the region of the tongue.

Between the circuit substrate 2 and the surface 1 a flexible, heat conductive element is mounted which consists of a cap 4.1 and a heat conductive insert 4.2 inserted in the same. Cap 4.1 is connected with the housing 5 at its opening via a resilient seal 6 out of a weak heat conductive silicone, whereby a good thermal insulation is ensured against the surroundings. The resilient seal 6 enables, in addition, a damage-free pressing of the sensor arrangement onto the surface 1 in a direction running perpendicular to surface 1 so that the temperature sensor 3 can be arranged in a defined distance to the surface 1. As long as the sensor arrangement is not mounted on the windshield, the resilient seal 6 is almost relaxed. In this case the cap 4.1 is affixed by a snap device not illustrated. During the installation on the windshield the cap 4.1 is pressed slightly into the resilient seal 6. Thereby the circuit substrate 2 slides into the heat conductive insert 4.2 and/or the heat conductive insert into the cap 4.1.

The cap 4.1 is formed such that its contact surface with surface 1 is maximal, respectively, the air gap between the cap 4.1 and surface 1 is minimal. Thereby a good thermal coupling between surface 1 and cap 4.1 is given, which ensures that the cap 4.1 has almost the same temperature as surface 1. Alternatively, cap 4.1 can be formed such that it rests almost punctiform on one or several points on the surface. Thereby the thermal coupling to the surface is slightly reduced but due to production-induced deviations i.e., varying unevenness of the surface from windshield to windshield does not lead to a varying thermal coupling.

The cap 4.1 is made of metal, preferably of copper or aluminium, the heat conducting insert 4.2 consists of a heat conductive silicone which is injected in the cap 4.1. As can more clearly seen in FIG. 1c, the insert 4.2 encloses the circuit substrate 2 except for a region at the upper side of the circuit substrate on which the temperature sensor 3 is arranged.

The flexible, heat conductive insert 4.2 is constructed such that it is pressed by the circuit substrate 2 against the cap 4.1, i.e. there is a close contact between the cap 4.1 and the flexible, heat conductive insert 4.2 on the one side, and the flexible, heat conductive insert 4.2 and the circuit substrate 2 on the other side. Through this close contact and the good heat conduction of the insert 4.2 it is ensured that the circuit substrate 2 in the direct proximity of the front surface 2.1 has approximately the temperature of the cap 4.1 and thus of the surface 1.

As hereinabove noted, in a particularly preferred development, there is a recess 4.3 in the insert in which the circuit substrate can be placed with the temperature sensor. Thereby, a particularly close heat contact of the temperature sensor with the insert is enabled.

The circuit substrate 2 is metallized in the region of the front surface 2.1, on the under side and the side surfaces. Through this a particularly good heat conduction between circuit substrate 2 and insert 4.2 is ensured. One of the electric contacts of temperature sensor 3 is connected electrically conductively with the front surfaces of circuit substrate 2. Alternatively, the electrical contact can also be connected through feed through interconnections with the underside of the circuit substrate 2. Through this the temperature of the temperature sensors 3 can be adjusted particularly well to the temperature of the insert 4.2.

Figure 2B:
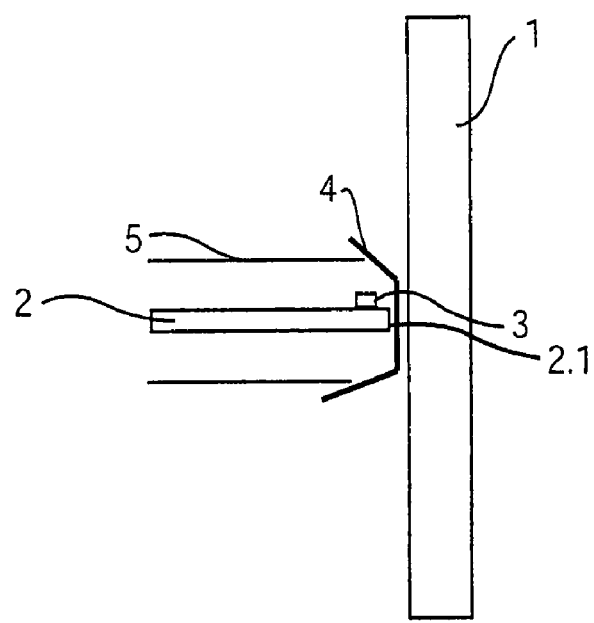

FIG. 2 shows a sensor arrangement in which the flexible, heat conductive element in contrast to the arrangement shown in FIG. 1 is formed by a heat conductive foil 4. Via the heat conducting foil 4 a good thermal contact with the surface 1 can likewise be ensured. The foil 4 is directly connected with the housing 5 of the circuit substrate 2.

In order to position the temperature sensor 3 in a defined distance to the surface 1, the circuit substrate 2 with the foil 4 is pressed on the surface 1 by attaching a resilient element (not shown) on the end of the circuit substrate 2 opposed to the front side 2.1. The resilient element effects a pressing with tolerance compensation perpendicular to surface 1 according to the resilient seal of FIG. 1.

Both the sensor arrangement shown in FIG. 1 as well as the one shown in FIG. 2 enable an attachment by means of a bayonet lock since the robust metal cap 4.1, respectively, the foil 4 ensure that a shifting or a twisting of the sensor arrangement along the surface 1 generally does not lead to a damage of the same. Such a damage could, for example, then occur when the insert 4.2 out of silicone would be in direct contact with the surface 1.

Other sensors as well as an evaluation unit, not illustrated in FIGS. 1 and 2, are mounted on the circuit substrate 2. The other sensors include a temperature sensor for measuring the temperature of the passenger compartment as well as a humidity sensor. The two other sensors can be used together with the temperature sensor to measure the surface temperature for determining the tendency for fogging of the windshield.

LIST OF REFERENCE NUMBERS

1 Surface
2 Circuit substrate
3 Front side of circuit substrate
3 Temperature sensor
4 Heat conductive foil
4.1 Cap
4.2 Insert
4.3 Recess
5 Housing
6 Seal

What is claimed is:

1. A sensor arrangement for measuring the temperature of a vehicle windshield, the sensor arrangement comprising:
    a circuit substrate having a tongue-shaped projection;
    a temperature sensor disposed on a front side of the tongue-shaped projection and positioned in direct proximity to the vehicle windshield and spaced apart from said circuit substrate;
    a flexible heat conductive element disposed on said circuit substrate surrounding said tongue-shaped projection proximate said temperature sensor; and
    a heat conducting cap attached to the heat conductive element for contacting said vehicle windshield.

2. The sensor arrangement according to claim 1, wherein the heat conductive element comprises a heat conductive material disposed in said cap.

3. The sensor arrangement according to claim 1, wherein said cap is made of a heat conductive metal.

4. The sensor arrangement according to claim 2, wherein said heat conductive element is made of a heat conductive silicone.

5. The sensor arrangement according to claim 2, further comprising a recess, disposed in said heat conductive element, for receiving said circuit substrate and said temperature sensor.

6. The sensor arrangement according to claim 5, wherein said heat conductive element is arranged on a side of said circuit substrate opposed to said temperature sensor.

7. The sensor arrangement according to claim 1, further comprising a housing for enclosing said circuit substrate and a flexible seal attaching said cap to said housing of.

8. The sensor arrangement according to claim 1, wherein said heat conductive element is made of a silicone heat conductive foil.

9. The sensor arrangement according to claim 8, wherein said heat conductive foil is connected to a circuit substrate housing surrounding said circuit substrate by gluing, soldering, clamping, screwing or injecting.

10. The sensor arrangement according to claim 1, wherein said circuit substrate is metallized on said front side, on circuit substrate side opposite said temperature sensor and/or on circuit substrate side surfaces.

11. The sensor arrangement according to claim 10, further comprising feedthrough interconnections mounted in said circuit substrate proximate said temperature sensor.

12. The sensor arrangement according to claim 1 further comprising an evaluating unit is additionally mounted on said circuit substrate.

13. The sensor arrangement according to claim 1 further comprising other sensors, mounted on said circuit substrate, said other sensor being selected from a group consisting of temperature sensors, humidity sensors and light sensors.

* * * * *